INVENTOR.
RAYMOND H. JAMES
CHARLES W. LUNDBERG

BY Thomas J. Nikolai
ATTORNEY

INVENTOR.
RAYMOND H. JAMES
CHARLES W. LUNDBERG
BY Thomas J. Nikolai
ATTORNEY

United States Patent Office 3,423,738

Patented Jan. 21, 1969

3,423,738

MAGNETIC MEMORY COMPARATOR

Raymond H. James, Bloomington, and Charles W. Lundberg, St. Paul, Minn., assignors to Sperry Rand Corporation, New York, N.Y., a corporation of Delaware Filed June 26, 1964, Ser. No. 378,151

U.S. Cl. 340—174 9 Claims

Int. Cl. G11b 5/00

ABSTRACT OF THE DISCLOSURE

An apparatus and a method of operation of a magnetizable memory element whereby there is achieved an asymmetrical switching threshold for bipolar drive fields. In the preferred embodiment such element is, from an initial complete-switch (saturated) stable-state, placed into a time-limited partial-switched preset stable-state having asymmetrical switching thresholds for opposite polarity drive fields wherein the lesser of said asymmetrical switching thresholds is substantially less in absolute magnitude than the switching threshold of said initial stable-state.

Ordinary magnetizable cores and circuits utilized in destructive readout devices are now so well known that they need no special description herein. However, for purposes of the present invention it should be understood that such magnetizable cores are capable of being magnetized to saturation in either of two directions. Furthermore, these cores are formed of magnetizable material selected to have a rectangular hysteresis characteristic which assures that after the core has been saturated in either direction a definite point of magnetic remanence representing the residual flux density in the core will be retained. The residual flux density representing the point of magnetic remanence in a core possessing such characteristics is preferably of substantially the same magnitude as that of its maximum saturation flux density. These magnetic core elements are usually connected in circuits providing one or more input coils for purposes of switching the core from one magnetic state corresponding to a particular direction of saturation, i.e., positive saturation denoting a binary "1" to the other magnetic state corresponding to the opposite direction of saturation, i.e., negative saturation, denoting a binary "0." One or more output coils are usually provided to sense when the core switches from one state of saturation to the other. Switching can be achieved by passing a current pulse of sufficient amplitude through the input winding in a manner so as to set up a magnetic field in the area of the magnetizable core in a sense opposite to the pre-existing flux direction, thereby driving the core to saturation in the opposite direction of polarity, i.e., of positive to negative saturation. When the core switches, the resulting magnetic field variation induces a signal in the windings on the core such as, for example, the above mentioned output or sense winding. The material for the core may be formed of various magnetizable materials.

One technique of achieving destructive readout of a toroidal bistable memory core is that of the well-known coincident current technique. This method utilizes the threshold characteristic of a core having a substantially rectangular hysteresis characteristic. In this technique, a minimum of two interrogate lines thread the core's central aperture, each interrogate line setting up a magnetomotive force in the memory core of one half the magnetomotive force necessary to completely switch the memory core from a first to a second and opposite magnetic state while the magnetomotive force set up by each separate interrogate winding is of insufficient magnitude to effect a substantial change in the memory core's magnetic state. A sense winding threads the core's central aperture and detects the memory core's substantial or insubstantial magnetic state change as an indication of the information stored therein.

One method of achieving a decreased magnetic core switching time is to employ the partial switching technique of time-limited or amplitude-limited switching as compared to the complete switching technique. In employing an amplitude-limited technique, the hysteresis loop followed by a core in cycling between its "1" and "0" states is determined by the amplitude of the drive signal, i.e., the amplitude of the magnetomotive force applied to the core. This is due to the fact that the duration of the drive signal is made sufficiently long to cause the flux density of each core in the memory system to build up to the maximum possible value attainable with the particular magnetomotive force applied, i.e., the magnetomotive force is applied for a sufficient time duration to allow the core flux density to reach a stabilized condition with regard to time. The core flux density thus varies only with the amplitude of the applied field rather than with the duration and amplitude of the applied field. In employing the complete switching technique, it is a practical necessity that the duration of the read-drive field be at least one and one-half times as long as the nominal switching time, i.e., the time required to cause the magnetic state of the core to move from one remanent magnetic state to the other, of the cores employed. This is due to the fact that some of the cores in the memory system have longer switching times than other cores, and it is necessary for the proper operation of a memory system that all the cores therein reach the same state or degree of magnetization on readout of the stored data. Also, where the final core flux density level is limited solely by the flux capacity of the core as with the complete switching technique, it is necessary that the cores making up the memory system be carefully graded such that the output signal from each core is substantially the same when the state of each core is reversed, or switched.

In a core operated by the time-limited technique the level of flux density reached by the application of a drive field of a predetermined amplitude is limited by the duration of the drive field. A typical cycle of operation according to this time-limited operation consists of applying a first drive field of a predetermined amplitude and duration to a selected core for a duration sufficient to place the core in one of its amplitude-limited unsaturated conditions. A second drive field having a predetermined amplitude and a polarity opposite to that of the first drive field is applied to the core for a duration insufficient to allow the core flux density to reach an amplitude-limited condition. This second drive field places the core in a time-limited stable-state, the flux density of which is considerably less than the flux density of the second stable-state normally used for conventional, or amplitude-limited operation. The second stable-state may be fixed in position by the asymmetry of the two drive field durations and by the procedure of preceding each second drive field duration with a first drive field application. Additionally, the second stable-state may be fixed in position by utilizing a saturating first drive field to set the first stable-state as a saturated state. The article "Flux Distribution in Ferrite Cores Under Various Modes of Partial Switching," R. H. James, W. M. Overn and C. W. Lundberg, Journal of Applied Physics, Supplement, Vol. 32, No. 3, pp. 38S–39S, March 1961, provides excellent background material for the time-limited switching technique.

The magnetic conditions and their definitions as discussed above may now be itemized as follows:

*Partial switching*

Amplitude-limited.—Condition wherein with a constant drive field amplitude, increase of the drive field duration will cause no appreciable increase in core flux density.

Time-limited.—Condition wherein with a constant drive field amplitude, increase of the drive field duration will cause appreciable increase in core flux density.

*Complete switching*

Saturated.—Condition wherein increase of the drive field amplitude or duration will cause no appreciable increase in core flux density.

Stable-state.—Condition of the magnetic state of the core when the core is not subject to a variable magnetic field or to a variable current flowing therethrough.

The term "flux density" when used herein shall refer to the net external magnetic effect of a given internal magnetic state; e.g., the flux density of a demagnetized state shall be considered to be a zero or minimum flux density while that of a saturated state shall be considered to be a maximum flux density of a positive or negative magnetic sense.

The terms "signal," "pulse," "field," etc., when used herein shall be used interchangeably to refer to the current signal that produces the corresponding magnetic field and to the magnetic field produced by the corresponding current signal.

The preferred embodiment of the present invention is concerned with an apparatus including and a method of operation of a magnetizable memory element having a substantially rectangular hysteresis characteristic in which the element, or core, is initially set into a first polarity substantially-saturated remanent magnetic stable-state. Subsequent coupling of a second and opposite polarity time-limited "preset" drive field pulse thereto moves the core's magnetization into a preset time-limited remanent magnetic stable-state. This preset state has asymmetrical switching thresholds for oppositely polarized amplitude-limited set drive fields; having a first switching threshold 28 for set drive fields of the opposite polarity to the preset drive field pulse, which first switching threshold is substantially less in absolute magnitude than a second switching threshold 30 for set drive fields of the same polarity as the preset drive field pulse. The amplitude-duration characteristic of the preferred set drive field pulse is limited to absolute magnitudes lying between those of the preset state's first and second switching thresholds. The subsequent coupling thereto of a set drive field pulse of either polarity is ineffective as regards the previously established set state. Furthermore, the drive field intensity required to establish this set state is substantially less than that normally utilized in prior art techniques. Such small asymmetrical first switching threshold is then utilized as a means of effecting a detectable change in the element's magnetization due to very small drive fields which fields have no effect upon the element's saturated stable-state switching thresholds. By combining a second "buck-out" core with the set core and coupling the set drive field pulse to only the set core, readout of the set core, buck-out core combination provides a difference output signal that is indicative of only the effect of a prior coupled set pulse of the opposite polarity to that of the preset pulse. It is an object of this invention to provide an apparatus and a method whereby a conventional magnetizable memory element may be utilized as a detector of an initial one of only one polarity signal of a minimum intensity bipolar set drive field, and further providnig lock-out of any subsequent one of said set drive fields.

Accordingly, it is a primary object of the present invention to provide a novel method of operating a magnetizable memory element.

It is a further object of the present invention to provide an apparatus and a method of operation of a magnetizable memory element whereby the element is initially conditioned into a time-limited preset stable-state and which can then be placed into an amplitude-limited set stable-state of substantial positive or negative magnetic remanence different from said preset state.

It is a further object of the present invention to provide an apparatus and a method of operation of a magnetizable memory element whereby the element is initially conditioned into a first polarized time-limited preset stable-state and which can then be placed into an oppositely polarized amplitude-limited set stable-state of substantially different magnetic remanence from said preset state by only one of two oppositely polarized drive fields.

It is a further object of the present invention to provide an apparatus and a method of operation of a magnetizable memory element whereby there is established different switching thresholds for negative and positive switching thresholds for negative and positive drive fields.

In one application of the present invention magnetizable memory elements, or cores, may be utilized as detectors of a magnetic memory array. In this application two cores are serially, oppositely-magnetically coupled to an output line while only one of said cores is coupled to an input line which may be the sense line of a multi-bit word of a true-complement Search Memory. The serial bit search of the multi-bit word induces in said sense line opposite polarity pulses indicative of a mismatch; e.g., a positive pulse for a true mismatch, and a negative pulse for a complement mismatch. The first mismatch signal of the proper polarity "sets" the magnetic state of the single coupled core into the set magnetic stable-state of substantial magnetic remanence from its preset stable-state. Subsequent mismatch signals, of a positive or negative polarity, are "locked out," i.e., are ineffective to alter this set state. After the search cycle has been completed interrogation of the two cores provides an output signal indicative of the result of the previous search cycle. By reversal of the polarities of the initial conditioning and preset drive fields—or the corresponding drive lines—a mismatch signal of opposite polarity may be detected.

Accordingly, it is a primary object of the present invention to provide a magnetic detector for a Search Memory.

It is a further object of the present invention to provide a detector for a Search Memory that is capable of detecting and storing either one of two polarity output signals indicative of a particular search cycle conclusion.

These and other more detailed and specific objects will be disclosed in the course of the following specification, reference being had to the accompanying drawings, in which.

To better understand a novel aspect of the present invention, a discussion of a constant current source driving signal as opposed to the use of a constant voltage source driving signal is presented.

Figure 1:
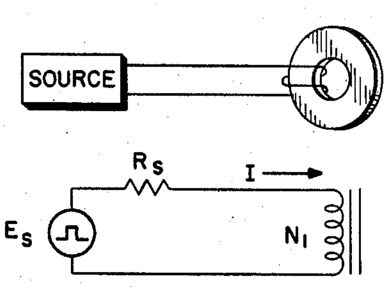
FIG. 1 is an illustration of the general circuit and its equivalent schematic of a source driving a toroidal ferrite core.

A constant voltage source is a source whose output voltage level is independent of the applied load while a constant current source is a source whose output current level is independent of the applied load. FIG. 1 illustrates the general circuit of a source driving a toroidal ferrite core with its equivalent circuit:

$E_s$=source voltage
$R_s$=source internal resistance
$N_1$=number of turns in the coil about the core
I=current flowing through the coil about the core.

This circuit may be defined mathematically by Equation 1.

$$E_s=IR_s-N\frac{d\phi}{dt} \qquad (1)$$

with it being assumed that the core is always initially in its negative saturated state and that the drive signal from the source drives the magnetic state of the core toward its positive saturated state. By making $R_s$ sufficiently small, Equation 1 reduces to Equation 2.

$$E_s\cong -N\frac{d\phi}{dt} \qquad (2)$$

Therefore by making $R_s$ sufficiently small the conditions of a constant voltage source are fulfilled. Since $E_s$ and N are constants, $d\phi/dt$ is also a constant, and consequently the flux reversal is a linear function of time.

$$\int_{-\phi_s}^{\phi_1} d\phi=\frac{E_s}{N_1}\int_0^t dt$$

$$\phi_s-\phi_1=\frac{E_s t}{N_1} \qquad (3)$$

For a complete flux reversal the integral, taken from $-\phi_s$ to $+\phi_s$, is (with $T_s$=time required for a complete flux reversal from $-\phi_s$ to $+\phi_s$)

$$\int_{-\phi_s}^{+\phi_s} d\phi=\frac{E_s}{N_1}\int_0^{T_s} dt$$

$$2\phi_s=\frac{E_s T_s}{N_1} \qquad (4)$$

The voltage E induced in any coil about the core is (with $N_2$=the number of turns of a second coil on the core)

$$E=\frac{E_s N_2}{N_1}=\frac{2\phi_s}{T_s}N_2$$

Figure 3:
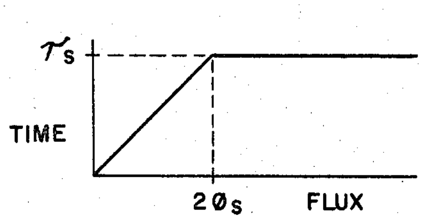
FIG. 3 is an illustration of the plot of flux versus time of the core of FIG. 1.
Figure 2:
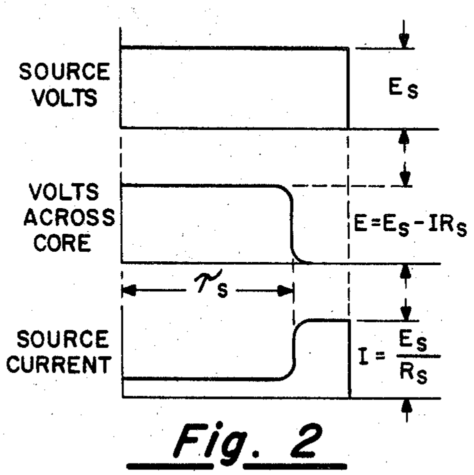
FIG. 2 is an illustration of the resulting voltages and currents of the circuit of FIG. 1 when driven by a constant voltage source.

The resulting voltages and currents under constant voltage source conditions are illustrated in FIG. 2. Equations 3 and 4 show that a plot of flux $\phi$ versus time would be as illustrated in FIG. 3. It is under these constant voltage source conditions that a toroidal ferrite core can be used as a counter, integrator or accumulator. See Patent Nos. 2,968,796 and 2,808,578 for typical uses of this principle of a constant voltage source. It is to be noted that the linear relationship of the plot of flux $\phi$ versus time over the range of $0<\phi<2\phi_s$ as illustrated in FIG. 3 is due to the characteristics of the constant voltage source rather than those of the core.

If $R_s$ is made sufficiently large, Equation 1 reduces to Equation 5.

$$E_s\cong IR_s \qquad (5)$$

Figure 4:
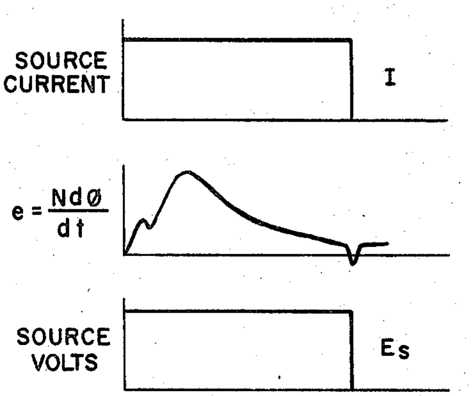
FIG. 4 is an illustration of the resulting voltages and currents of the circuit of FIG. 1 when driven by a constant current source.

Therefore, by making $R_s$ sufficiently large, the conditions of a constant current source are fulfilled. From inspection of Equation 5 it is apparent that the constant current source has an insignificant effect on the flux reversal or the rate of flux reversal in the core. Under these conditions the flux reversal can be thought of as the intrinsic magnetic behavior of the core with the resulting voltages and currents under constant current source conditions as illustrated in FIG. 4. It is under these constant current source conditions that this present invention is concerned.

A phenomenological understanding of a time-limited flux state in a toroidal core, or the flux path about an aperture in a plate of magnetizable material such as a transfluxor, can be obtained by considering the flux distribution therethrough. The switching time $\tau_s$, or the time required for complete flux reversal from a first flux saturated state to a second and opposite flux state is given as follows:

$$\tau_s=\frac{S_w}{H-H_0}=\frac{S_{w'}}{NI-NI_0}$$

where $r$=radius of toroidal core
$\tau_s$=switching time
I=current in amperes
$S_w$=material constant
N=number of turns
H=applied field in oe. (oersteds)=$NI/5r$
$H_0$=switching threshold in oe.=$NI_0/5r$
$S_{w'}=S_w 5r$ With particular reference to FIG. 5 there is illustrated a residual magnetization curve 10 of the magnetic devices utilized by the present invention. Curve 10 is a plot of the irreversible flux $\phi$ versus the applied magnetomotive force NI where the duration of the current pulse is always greater than the switching time $\tau_s$ of the core, e.g., the applied field is of a sufficient duration to switch the magnetic state of the core from a first saturated remanent magnetic stable-state, such as $-\phi_s$, into a second and opposite saturated remanent magnetic stable-state, such as $+\phi_s$.

Curves 12 and 14 are the residual magnetization curves from the preset stable-state $\phi_0$ which stable-state is achieved by a time-limited preset drive field pulse from an initial stable-state $-\phi_s$. Curves 12 and 14 are achieved by the application of negative and positive drive fields, respectively. These curves are obtained by applying drive field current pulses of different amplitudes and of a duration greater than the longest $\tau_s$ of the core, i.e., amplitude-limited, so as to permit the total possible flux change representative of the particular drive field amplitude to occur. Curve 18 is the residual magnetization curve from the set stable-state $\phi$ in a +NI direction. By applying a negative polarized set drive field current pulse of a particular amplitude and of a duration greater than the longest $\tau_s$ the magnetic state of the core is moved along the normal magnetization curve 12 coming to rest at point 16 as determined by the amplitude of the applied set drive field. Upon cessation of the set drive field, the magnetic state of the core falls back along curve 22 toward the line 20, of zero applied field, coming to rest at a set stable-state $\phi_1$ thereon. Subsequent application of a positive or negative drive field of the same amplitude-duration characteristic as the particular set drive field that moved the magnetic state of the core from the preset stable-state $\phi_0$ to the set stable-state $\phi_1$ of substantial magnetic change, causes the magnetic state of the core to merely move along a line of substantially constant flux density between the limits of lines 32–34 returning to its original set stable-state $\phi_1$ along line 20. Applicants have discovered that in the present operation as described above there is realized an asymmetrical switching threshold as regards a subsequent set drive field of a polarity opposite to the preset drive field. This asymmetry ensures that a subsequent set drive field of the same or opposite polarity but of the same amplitude-duration characteristic as the set drive field that moved the core's magnetic state into the set stable-state $\phi_1$ from the preset stable-state $\phi_0$, will not drive the core's magnetic state into an area of substantially different flux density, i.e., beyond the switching threshold, so as to permit the core's magnetization after cessation of the subsequent set drive field to fall back upon line 20 at a new stable-state of a different flux density.

As an example of the above, assume the core to be initially in a negative substantially saturated stable-state as at $-\phi_s$. Application of a positive time-limited preset drive field of a predetermined time-limited characteristic moves the magnetic state of the core along curve 10 to point 24 representative of the maximum flux density than can be achieved by that particular time-limited characteristic. After cessation of this preset drive field the magnetic state of the core falls back along curve 26 to come to rest at the associated time-limited preset stable-state $\phi_0$. This preset state $\phi_0$ has asymmetrical switching thresholds for oppositely polarized amplitude-limited set drive fields; a first switching threshold 28 for set drive fields of the opposite polarity to the preset drive field pulse, which first switching threshold is substantially less in absolute magnitude than a second switching threshold 30 for set drive fields of the same polarity as the preset drive field pulse. Using point 30 as the maximum absolute amplitude-limited set drive field characteristic the operating range of a preferred set drive field intensity is determined, as for an example, to lie between the symmetrical negative and positive limits of lines 32 and 34, respectively. Application of a positive polarized set drive field pulse moves the magnetic state of the core along curve 14 to line 34 and upon cessation back to $\phi_0$. Thus, no substantial change is effected in the remanent magnetic state of the core due to application of such a pulse. However, application of a negative polarized set drive field pulse of the same amplitude-duration characteristic as the positive polarized set drive field pulse moves the magnetic state of the core along curve 12 beyond switching threshold 28 to point 16 and upon cessation back along curve 22 to $\phi_1$. Application of a subsequent positive drive field of an amplitude-limited characteristic not exceeding that of the original set drive field moves the core's magnetic state back along curve 18 but not beyond line 34 such that upon cessation of the subsequent positive drive field the core's magnetic state returns along curve 18 to its original set stable-state of $\phi_1$. Application of a subsequent negative drive field of an amplitude-limited characteristic not exceeding that of the original set drive field moves the core's magnetic state out along curve 22 but not beyond line 32 such that upon cessation of the subsequent negative drive field the core's magnetic state returns along curve 22 to its original set stable-state of $\phi_1$.

Figure 5:
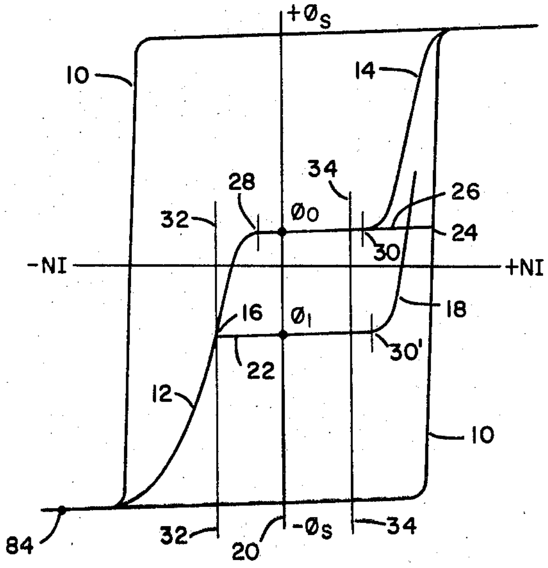
FIG. 5 is an illustration of the residual magnetization of the core of FIG. 1 utilizing particular time-limited preset and amplitude-limited set drive signals.

Inspection of curves 12 and 14 of FIG. 5 illustrates the asymmetric nature of the switching thresholds thereof. Remembering that the distance along the axis of abscissas, i.e., in a +NI or −NI direction, represents the magnetizing force of the applied drive field, inspection of curves 12 and 14 indicates that the distance along curve 12 from the associated set stable-state $\phi_0$ along the axis of ordinates, i.e., zero magnetomotive force line 20, in the −NI direction to the switching threshold defined by point 28 is less than the distance along curve 14 in the +NI direction from the associated set stable-state $\phi_0$ to the switching threshold defined by point 30. As an example: the distance from $\phi_0$ to point 28 is less than the distance from $\phi_0$ to point 30. Accordingly, it is apparent that there is provided hereby a method of operating a magnetizable memory element having different switching thresholds to drive fields of opposite polarity but of the same amplitude-duration characteristic.

Figure 6:
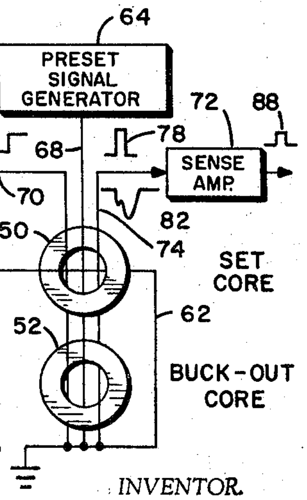
FIG. 6 is an illustration of a device for the implementation of the present invention.

With particular reference to FIG. 6 there is illustrated an apparatus for the implementation of the present invention. In this apparatus there are utilized two substantially similar toroidal ferrite cores, 50 and 52, each core having the magnetic characteristics of FIG. 5. Constant current type signal generator 60 is coupled only to core 50 in a first magnetic sense by way of drive line 62 while constant current preset signal generator 64 and constant current read signal generator 66 are coupled to cores 50 and 52 in the same first magnetic sense by way of drive lines 68 and 70, respectively. Sense amplifier 72 is coupled to core 50 in a first magnetic sense and to core 52 in a second opposite magnetic sense by way of sense line 74. Operation of this apparatus is as follows:

1. *Preconditioning*

(a) Cores 50 and 52 are placed into an initial substantially saturated stable-state $-\phi_s$ by the coupling of negative saturating drive field signal 76 to line 70 by constant current source type generator 66. Next, constant current source type generator 64 couples a positive, time-limited preset drive field signal 78 to cores 50 and 52 by way of line 68. Both cores 50 and 52 have their magnetization set in the preconditioned preset stable-state $\phi_0$.

2. *Write-in*

(a) Write-in is initiated by constant current source type generator 60 coupling negative, amplitude-limited, set drive field signal 80 to core 50 by way of line 62. Set drive field signal 80 sets the magnetic state of core 50 into its amplitude-limited set stable-state along line 20 (see FIG. 5) as for example $\phi_1$; the magnetic state of core 52 remains in its preconditioned preset stable-state along line 20, as for example $\phi_0$.

3. *Readout*

(a) Readout is initiated by constant current source type generator 66 coupling negative saturating read drive field signal 76 to both cores 50 and 52 by way of drive line 70; read signal 76 drives the magnetic states of both cores 50 and 52 into a state of substantial negative saturation such as point 84 of FIG. 5 and at its cessation allows the magnetic states of cores 50 and 52 to come to rest at the negative saturated stable-state $-\phi_s$.

(b) The variation of the magnetic states of cores 50 and 52, due to the oppositely wound sense line 74 thereabout, generates an output difference-signal therein due to the net flux change of $$[\phi_0-\phi_s]-[\phi_1-\phi_s]=\phi \text{ NET}$$

This generates a negative output signal 82 in sense line 74 indicative of a negative preset signal 78 causing sense amplifier 72 to emit output signal 88.

By inspection of FIG. 5 it can be seen that if generator 60 had coupled a positive, amplitude-limited, set drive field signal 86 of the same amplitude-duration characteristics as signal 80 the magnetic state of core 52 would merely have traversed curve 14 to the limit of line 34 and upon cessation of such drive field would have returned to its prior preset stable-state $\phi_0$. Upon readout the variation of the magnetic flux of cores 50 and 52 would cancel $$[\phi_0-\phi_s]-[\phi_0-\phi_s]=0$$

generating a negligible output signal in sense line 74 indicative of a positive preset signal 86.

Figure 8:
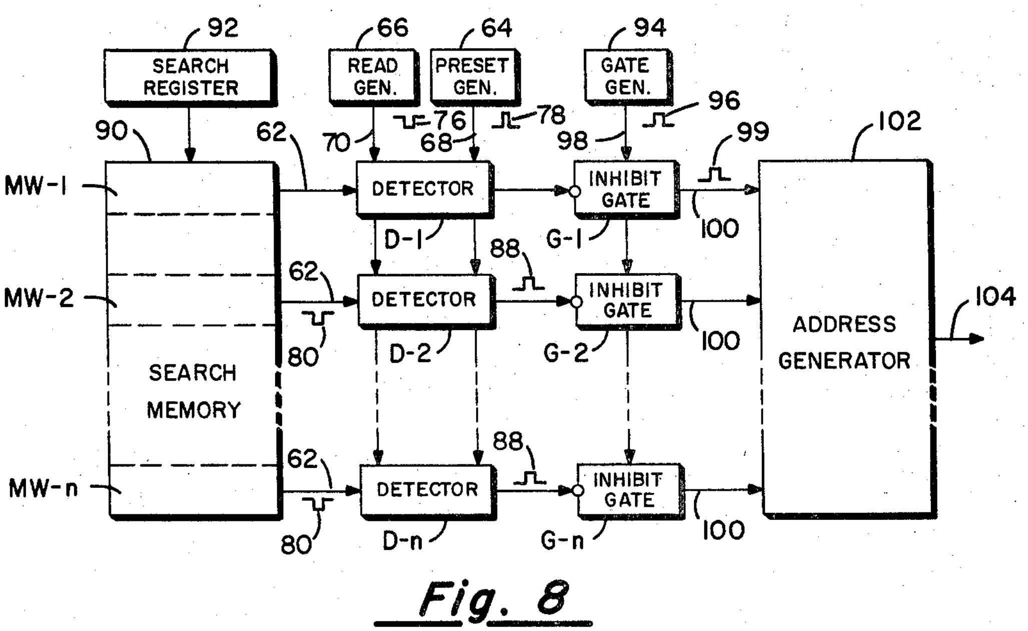
FIG. 8 is an illustration of a multi-word search memory system utilizing the apparatus of FIG. 6.

With particular reference to FIG. 8 there is disclosed a preferred embodiment of the present invention as a detector for a search memory. The search memory of this application is organized into two half-sections; one section contains the true form of a multi-bit word stored in memory and the other section contains the complement form of the multi-bit word. A search register holds the word searched for or compared with each bit of the multi-bit search word coupled serially to all the corresponding ordered true or complement bits of the plurality of words in memory. If the particular bit of the search word is a "1" it drives all the true forms of the corresponding ordered bits of the memory words while if a "0," it drives all the complement forms of the corresponding ordered bits of the memory words. The memory elements of the search memory are such that if the bit in the search word matches the bit in the memory word no output signal is induced in the coupled sense line while if the bit in the search word does not match, i.e., mismatches, the bit in the memory word, an output signal is induced in the coupled sense line. Each memory word has two sense lines; one serially coupled to all the true bit forms, and another serially coupled to all the complement bit forms. The search is conducted by initially driving all the serially coupled corresponding highest ordered bits of the memory words according to the search word bit, with the search continued by bit serially driving the serially coupled corresponding ordered bits of the memory words from the highest to the lowest ordered bits of the search word. After the bit serial search is completed the detectors coupled to the sense lines may then be interrogated to determine the result of the search. In the apparatus of FIG. 8 the input to the detector may be considered as the output of the true sense line of a memory word of a search memory array; a mismatch of a true form produces a positive pulse on the true sense line, while a match produces no output signal. The following copending patent applications assigned to the same assignee as is the present application disclose typical true-complement search memories: V. J. Korkowski, Ser. No. 206,864 filed July 2, 1962, now Patent No. 3,192,512; D. E. Keefer, Ser. No. 19,833 filed Apr. 4, 1960, now Patent No. 3,155,945.

For purposes of the present discussion assume that an equality search is to be conducted. This requires the performance of only one programmed search operation. For this operation a search word equal to the word to be searched for is inserted in the search register and a search operation is performed. The detector read line is then pulsed by a readout signal providing an output signal from those detectors detecting a mismatch condition. External logic circuitry accepts such output signal performing an Inhibit Gate decision thereon which if not inhibited by the output signal produces a signal indicative of an equality (=) find. This signal is then coupled to an address encoder that provides a signal indicative of the address(es) of the word(s) in the search memory equal to the search word.

With particular reference to FIG. 8 there is disclosed a search memory system incorporating the apparatus of FIG. 6. In this system search memory array 90 has an illustrated capacity of *n* four-bit memory words MW–1 through MW–*n*; each memory word is coupled to its associated detector D–1 through D–*n*. The operation of this system is as discussed with particular reference to FIG. 6, above. After an initial preconditioning operation in which the cores of detectors D–1 through D–*n* are preset into a preset magnetic state by the coupling of the proper signals 76 and 78 thereto by read signal generator 66 and preset signal generator 64, respectively, the search word, or the word that is to be compared with memory words MW–1 through MW–*n* of search memory array 90, is inserted into search register 92. The search is conducted by initially driving all the serially coupled corresponding highest ordered bits of the memory words according to the search word bit, with the search continued by bit serially driving the serially coupled corresponding ordered bits of the memory words from the highest to the lowest ordered bits of the search word. After the bit serial search is completed, the detectors D–1 through D–*n* may then be interrogated to determine the result of the previous search. Upon their interrogation the appropriate detectors D–1 through D–*n* couple the respectively appropriate output signals representative of a mismatch to Inhibit Gates G–1 through G–*n*. Inhibit Gates G–1 through G–*n* are concurrently pulsed by gate pulse 96 which if not coincident with a corresponding detector output signal 88 couples a mismatch signal to address generator 102. Address generator 102 in turn then provides an output signal indicative of the address(es) of the particular memory word(s) which fulfills the equality search function.

Figure 7:
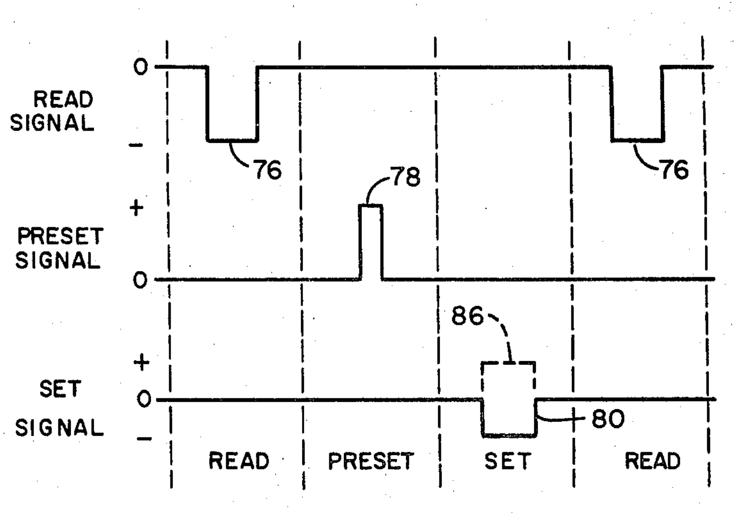
FIG. 7 is an illustration of the amplitude-duration characteristics of the drive signals utilized with the device.

As an example and as was previously discussed with respect to FIGS. 6 and 7, assume that an equality search is to be conducted on the system of FIG. 8 wherein only memory word MW–1 is equal to the search word. This requires performance of a single programmed search operation. For this operation a search word equal to the word to be searched for is inserted in search register 92 and an equality search operation is performed providing a mismatch signal 80 on the appropriate search memory sense lines 62. Read signal generator 66 then couples readout signal 76 through serially coupled detectors D–1 through D–*n* by way of its associated read line 70 causing those detectors for which a mismatch condition was detected to couple an appropriate signal 88 to their associated inhibit gates G–1 through G–*n*. Concurrent with the coupling of readout signal 76 to detectors D–1 through D–*n*, gate signal generator 94 couples gate pulse 96 through serially coupled inhibit gates G–1 through G–*n* by way of gate line 98. Those inhibit gates that are not inhibited by an output signal 88 emit a mismatch find signal 99 on their associated output lines 100 which are coupled to address generator 102. Address generator 102 translates the match find signal 99 into an output signal on line 104 indicative of the address of the associated memory word in search memory array 90 that fulfills the search conditions for an equality find, e.g., MW–1.

It is understood that suitable modifications may be made in the structure as disclosed provided such modifications come within the spirit and scope of the appended claims. Having now, therefore, fully illustrated and described our invention, what we claim to be new and desire to protect by Letters Patent is set forth in the appended claims.

What is claimed is:

1. A detector apparatus affected by only the first second-polarity set signal of a plurality of first and second opposite polarity set signals of substantially the same amplitude-duration characteristic, comprising:

first and second magnetic elements each having a substantially rectangular hysteresis characteristic defining first and second opposite-polarized saturated stable-states and having a plurality of intermediate unsaturated stable-states;

preset signal constant current drive means for coupling a first-polarity time-limited preset drive signal to said first and second elements for presetting the magnetization of said elements into a first polarity time-limited preset stable-state;

set signal constant current drive means for selectively coupling to only said preset first element first or second opposite-polarity amplitude-limited set drive signals, each set signal of substantially the same amplitude-limited characteristic for setting the magnetization of said first element in a corresponding initial second-polarity amplitude-limited set stable-state;

sense amplifier means coupled to said elements in an opposing magnetic sense;

read signal constant current drive means for coupling a saturating read drive signal to said first and said second elements in the same magnetic sense for setting the magnetization of said first and second elements into a saturated stable-state from said set and preset stable-states, respectively, for causing said sense amplifier means to generate a difference-signal therein;

said difference-signal indicative of said first element having been set into said second-polarity amplitude-limited set stable-state by a second-polarity amplitude-limited set signal.

2. A detector apparatus affected by only the first second-polarity set signal of a plurality of first and second oppositely polarized set signals of substantially the same amplitude-duration characteristic, comprising:

first and second magnetic elements each having a substantially rectangular hysteresis characteristic defining first and second oppositely-polarized saturated stable-states and having a plurality of intermediate unsaturated stable-states;

preset signal constant current drive means for coupling a first-polarity time-limited preset drive signal to said elements in the same magnetic sense for presetting the magnetization of said elements into a first-polarity time-limited preset stable-state;

set signal constant current drive means for selectively coupling to only said preset first element a first-polarity or a second and opposite polarity amplitude-limited set drive signal, each of said opposite polarity set signals of substantially the same amplitude-limited characteristic for setting the magnetization of only said first element in only a corresponding second-polarity amplitude-limited set stable-state;

sense amplifier means coupled to said elements in an opposing magnetic sense;

read signal constant current drive means for coupling a second-polarity saturating read drive signal to said first and second elements in the same magnetic sense for setting the magnetization of both of said elements into the same second-polarity saturated stable-state from said set or preset stable-states for causing said sense amplifier means to generate a corresponding difference-signal therein;

said difference-signal indicative of said first element having been set into said second-polarity amplitude-limited set stable-state.

3. A magnetic memory apparatus having inherent magnetic lockout, comprising:

a magnetic element having a substantially rectangular hysteresis characteristic defining first and second oppositely-polarized saturated stable-states and having a plurality of intermediate unsaturated stable-states;

preset signal constant drive means for coupling a first-polarity time-limited preset drive signal to said element for presetting the magnetization of said element into a first-polarity time-limited preset stable-state having a first-polarity first and a second-polarity second switching threshold, each of said first and second switching thresholds being substantially less than the switching thresholds of said first and second saturated stable-states;

said first-polarity first switching threshold of said first-polarity time-limited preset stable-state being substantially greater than said second-polarity second switching threshold of said first-polarity time-limited preset stable-state, the exceeding of either threshold causing a significant change in the magnetization of said preset stable-state;

set constant current drive means for initially selectively coupling to said element a first-polarity or a second and opposite polarity set drive signal, each set signal being of substantially the same amplitude-limited characteristic, said element responsive only to said second-polarity set drive signal for setting the magnetization of said element in a second-polarity amplitude-limited set stable-state corresponding to said second-polarity set drive signal;

said set drive means subsequently coupling a plurality of said first and second-polarity set drive signals to said element and for affecting no substantial change in the magnetization of said first or second set stable-state producing effective lockout of said subsequent first and second-polarity set drive signals for providing an apparatus that is effected by only the first one of said second-polarity set drive signal.

4. A magnetic memory apparatus having inherent magnetic lockout, comprising:

a magnetic core having a substantially rectangular hysteresis characteristic defining first and second oppositely-polarized saturated stable-states and having a plurality of intermediate unsaturated stable-states;

preset signal constant current drive means for coupling a first-polarity time-limited preset drive signal to said core for presetting the magnetization of said core into a first-polarity time-limited preset stable-state;

set signal constant current drive means for initially selectively coupling to said core a first or a second and opposite-polarity amplitude-limited set drive signal, each of said opposite polarity set signals of substantially the same amplitude-limited characteristic for setting the magnetization of said core in only a corresponding second-polarity amplitude-limited set stable-state having corresponding different switching thresholds to subsequent first and second-polarity set signals which different switching thresholds are intermediate the switching thresholds of said saturated stable-state;

subsequent coupling of said first and second-polarity amplitude-limited set drive signals to said core effecting no substantial change in the magnetization of said second-polarity amplitude-limited set stable-state producing an effective lockout of said subsequent first and second-polarity amplitude-limited set drive signals providing an apparatus that is affected by only the first one of said second-polarity amplitude-limited set drive signals.

5. A magnetic memory apparatus having inherent magnetic lockout, comprising:

a magnetic element having a substantially rectangular hysteresis characteristic defining first and second oppositely-polarized saturated stable-states and having a plurality of intermediate unsaturated stable-states;

preset signal constant current drive means for coupling a first-polarity time-limited preset drive signal to said element for setting the magnetization of said element into a first-polarity time-limited preset stable-state;

set signal constant current drive means for initially selectively coupled to said element first and second opposite-polarity amplitude-limited set drive signals, each of said opposite polarity set signals of substantially the same amplitude-limited characteristic for setting the magnetization of said element in only a corresponding second-polarity amplitude-limited set stable-state;

subsequently coupling of said first and second-polarity amplitude-limited set drive signals to said element effecting no substantial change in the magnetization of said second amplitude-limited set stable-state producing an effective lockout of said subsequent first and second-polarity amplitude-limited set drive signals providing an apparatus that is effected by only the first one of said second-polarity amplitude-limited set drive signal.

6. A mismatch detector for a bit serial Search memory, comprising:

a plurality of magnetic elements each having a substantially rectangular hysteresis characteristic defining first and second oppositely-polarized saturated stable-states and having a plurality of intermediate unsaturated stable-states;

a first one of said elements designated the set element;

a second one of said elements designated the buck-out element;

preset signal constant current drive means for coupling a first-polarity time-limited preset drive signal to said set and buck-out elements for presetting the magnetization of said elements into similar initial first-polarity time-limited preset stable-states;

Search memory constant current drive means for selectively coupling to only said set element a first or a second and opposite polarity amplitude-limited set drive signal, each of said opposite-polarity set signals of substantially the same amplitude-limited characteristic for setting the magnetization of only said set element in a corresponding second-polarity amplitude-limited set stable-state;

detector sense amplifier means coupled to said set and buck-out elements in an opposing magnetic sense;

read signal constant current drive means for coupling a saturating read drive signal to said set and buck-out elements in the same magnetic sense for setting the magnetization of said elements into one of said first or second oppositely-polarized saturated stable-state from said amplitude-limited set and time-limited preset stable-states, respectively, causing said sense amplifier means to generate a difference-signal therein;

said difference-signal indicative of said set element having been set into said second-polarity amplitude-limited set stable-state indicative of a search memory mismatch condition.

7. A mismatch detector for a bit serial Search memory having the capabitlity of providing a specified search function find indication, comprising:

a plurality of magnetic elements each having a substantially rectangular hysteresis characteristic defining first and second oppositely-polarized saturated stable-states and having a plurality of intermediate unsaturated stable-states;

a first one of said elements designated the set element;

a second one of said elements designated the buck-out element;

preset signal constant current drive means for coupling a first-polarity time-limited preset drive signal to said first and second elements for setting the magnetization of said elements into similar, initial, first-polarity time-limited preset stable-states;

Search memory constant current drive means for selectively coupling to only said first element a first or a second and opposite polarity amplitude-limited set drive signal, each of said opposite-polarity set signals of substantially the same amplitude-limited characteristic for setting the magnetization of only said first element in a corresponding second-polarity amplitude-limited set stable-state;

detector sense amplifier means coupled to said first and second elements in an opposing magnetic sense;

read signal constant current drive means for coupling a saturating read drive signal to said first and second elements in the same magnetic sense for setting the magnetization of said elements into one of said first or second oppositely-polarized saturated stable-states from said time-limited set and amplitude-limited preset stable-states, respectively, causing said sense amplifier means to generate a difference-signal therein;

said difference-signal indicative of only said first element having been set into said second-polarity amplitude-limited set stable-state indicative of a Search memory mismatch condition.

8. A true-complement search memory system for the bit-serial comparison of a search word to a plurality of memory words comprising:

a search register for holding a multi-bit search word;

a search memory for holding a plurality of multi-bit memory words storing the true and the complement form of each bit of each memory word, all the true forms of all the bits of each separate memory word coupled to an associated separate true sense line and all the complement forms of all the bits of each separate memory word coupled to an associated separate complement sense line;

the search register performing a bit-serial comparison of each bit of the multi-bit search word, from the highest to the lowest ordered bit, by coupling a drive signal from each search register bit position to all the like ordered bits of the memory words, a mismatch of a search register bit "1" generating a true mismatch signal in its said true sense line and a mismatch of a search register bit "0" generating a complement mismatch signal in its said complement sense line;

a plurality of detectors, each separate detector coupled to an associated separate memory word by said associated true or complement sense lines;

an initial one of said true or complement mismatch signals when coupled to said associated detector from said associated memory word setting said associated detector in a set information state representative of a true or a complement mismatch, respectively;

subsequent coupling of said true or complement mismatch signals to said associated detector effecting no substantial change in said set information state producing an effective lockout of any said subsequent true or complement mismatch signals providing a detector that is effected by only the first one of said true or complement mismatch signal;

read signal means for coupling a read drive signal to said detectors;

the coupling of said read drive signal to said detectors providing detector output signals from those detectors that detected a true or a complement mismatch condition;

an address generator for providing address output signals representative of the search memory address of the memory word associated with a respective detector output signal;

said detector output signals coupled to said address generator for providing address output signals representative of the search memory address of the memory word associated with a respective detector output signal.

9. A true-complement search memory system for the bit-serial comparison of a search word to a plurality of memory words to provide a mismatch find indication, comprising:

a search register for holding a multi-bit search word;

a search memory for holding a plurality of multi-bit memory words storing the true and the complement form of each bit of each memory word, all the true forms of all the bits of each separate memory word coupled to an associated separate true sense line and all the complement forms of all the bits of each separate memory word coupled to an associated separate complement sense line;

the search register performing a bit-serial comparison of each bit of the multi-bit search word, from the highest to the lowest ordered bit, by coupling a drive signal from each search register bit position to all the like ordered bits of the memory words, a mismatch of a search register bit "1" generating a true mismatch signal in its said true sense line and a mismatch of a search register bit "0" generating a complement mismatch signal in its said complement sense line;

a plurality of detectors, each separate detector coupled to an associated separate memory word by said associated true or complement sense lines;

an initial one of said true or complement mismatch signals when coupled to said associated detector from said associated memory word setting said associated detector in a set information state representative of a mismatch condition;

subsequent coupling of one or more of said true or complement mismatch signals to said associated detector effecting no substantial change in said set information state producing an effective lockout of said subsequent true or complement mismatch signals providing a detector that is effective by only the first one of said true or complement mismatch signals;

read signal means for coupling read drive signals to said detectors;

the coupling of said read drive signals to said detectors providing detector output signals from those detectors that detected a mismatch condition;

an address generator for providing address output signals representative of the search memory address of the memory word associated with a respective detector output signal;

said detector output signals coupled to said address generator for providing address output signals representative of the search memory address of the memory words associated with said detector output signals indicative of a mismatch find condition.

References Cited

UNITED STATES PATENTS

| | | | |
|---|---|---|---|
| 3,112,470 | 11/1963 | Barrett et al. | 340—174 |
| 3,124,700 | 3/1964 | Burns | 307—88 |

JAMES W. MOFFITT, *Primary Examiner.*

U.S. Cl. X.R.

340—146.2; 235—177

UNITED STATES PATENT OFFICE

CERTIFICATE OF CORRECTION

Patent No. 3,423,738 January 21, 1969

Raymond H. James et al.

It is certified that error appears in the above identified patent and that said Letters Patent are hereby corrected as shown below:

Column 10, line 50, "opposite-polarized" should read -- oppositely-polarized --. Column 12, line 48, "coupled" should read -- coupling --. Column 15, line 2, "effective" should read -- effected --.

Signed and sealed this 17th day of March 1970.

(SEAL)
Attest:

Edward M. Fletcher, Jr.
Attesting Officer

WILLIAM E. SCHUYLER, JR.
Commissioner of Patents